United States Patent

Priestley

[15] 3,697,587
[45] Oct. 10, 1972

[54] PROCESS AND COMPOUNDS
[72] Inventor: Hill M. Priestley, North Bergen, N.J.
[73] Assignee: Lever Brothers Company, New York, N.Y.
[22] Filed: June 30, 1969
[21] Appl. No.: 837,863

Related U.S. Application Data

[63] Continuation-in-part of Ser. No. 579,211, Sept. 14, 1966, Pat. No. 3,467,717, which is a continuation-in-part of Ser. No. 329,386, Dec. 10, 1963, Pat. No. 3,331,878.

[52] U.S. Cl......260/501.19, 260/515 M, 260/606.5, 252/89, 252/541, 252/545
[51] Int. Cl.............................................C07c 63/00
[58] Field of Search.......260/501.19, 515 M, 606.5 P

[56] References Cited

UNITED STATES PATENTS 3,331,878 7/1967 Priestley..............260/606.5 P
3,005,029 10/1961 Buckler et al........260/606.5 P

*Primary Examiner*—Leon Zitver
*Assistant Examiner*—Michael W. Glynn
*Attorney*—Brumbaugh, Graves, Donohue & Raymond

[57] ABSTRACT

A group of novel alkali metal and ammonium soaps formed from intermediate phosphine oxides is disclosed having the generic formula:

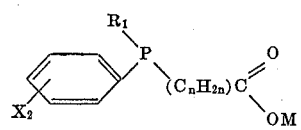

wherein $R_1$ is an acyclic aliphatic hydrocarbon radical having from eight to 18 carbon atoms, $n$ is an integer from 0 to 2, $X_2$ is a member of the group consisting of H and alkyl having one to 14 carbon atoms, and M is a water-solubilizing cation.

11 Claims, No Drawings

PROCESS AND COMPOUNDS

This application is a continuation-in-part of my co-pending application Ser. No. 579,211 filed Sept. 14, 1966 now Pat No. 3,467,717, which was in turn, a continuation in-part of my application Ser. No. 329,386 filed Dec. 10, 1963 (now U.S. Pat. No. 3,331,878).

The present invention relates to alkali metal and ammonium soaps which are derived from the intermediate phosphine oxides disclosed and claimed in my above-mentioned Pat. application No. 579,211. The intermediate phosphine oxides have the generic formula:

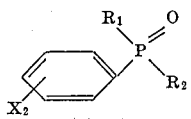

wherein $R_1$ is an acyclic aliphatic hydrocarbon group having from eight to 18 carbon atoms, $R_2$ is an alkenyl radical having from three to five carbon atoms, and X is hydrogen or an alkyl having one to 14 carbon atoms. These phosphine oxides are to be distinguished from known phosphine oxides containing three long-chain alkyl groups in the molecule and phosphine oxides containing three short-chain alkyl groups in the molecule, as well as from phosphine oxides of the type generally claimed in my U.S. Pat. No. 3,331,878 mentioned above wherein the phosphine oxide contains one long-chain acyclic aliphatic or aryl-aliphatic group of about eight to 18 carbon atoms and two short-chain groups which may be joined in a cyclic structure.

The intermediate phosphine oxides of the present invention are characterized, as will be noted, by having three different groups attached to the phosphorus atom, namely, a long-chain aliphatic group, a benzene ring and a short-chain alkenyl group, all attached to the phosphorus nucleus. The alkenyl group of the phosphine oxides of the present invention is subjected to the action of an oxidizing agent such as potassium permanganate, thereby breaking the olefinic bond and producing a carboxylic acid having a phosphine oxide group. The alkali, metal and ammonium soaps of these carboxylic acids are useful detergents. In the alternative, the alkenyl compounds may be hydroxylated to yield the corresponding dihydroxy compounds which are useful lime soap scum dispersants.

The intermediate alkenyl-substituted compounds may be prepared from dialkenylphenylphosphines or from phenylphospholenes by quaternizing either of the foregoing compounds, using the halide of the long-chain aliphatic group desired in the final product. The quaternary compound is then converted into the corresponding phos-phonium hydroxide, and, under appropriate conditions, the phosphonium hydroxide can be made to eliminate one of the alkenyl groups (or in the case of phospholene compounds, the ring is opened) with the formation of an alkenyl substituted phosphine oxide. Where compounds having a $C_3$ alkenyl group are desired, a dialkenyl phosphonium halide will be employed, while the methyl butenyl compound and its derivatives are normally synthesized via the phospholene ring route. The foregoing syntheses are applicable to compounds in which the phenyl group is substituted by a $C_1$–$C_{14}$ alkyl, as well as to the unsubstituted compounds.

The carboxy or dihydroxy alkyl substituted compounds are derived from the alkenyl-substituted phosphine oxides. Oxidation or hydroxylation of the alkenyl group using conventional techniques yields the carboxy, or dihydroxy alkyl substituted compounds of the present invention. Oxidation of the alkenyl group by hydrogen peroxide in the presence of formic acid, followed by hydrolysis of the resultant diformate yields hydroxy compounds.

In order to obtain the desired intermediate phosphine oxides, the conditions under which the phosphonium hydroxide is decomposed are of importance. The phosphonium halides are treated with an alkaline material yielding a pH above about 9 in 10 percent aqueous solution in a reaction solvent which consists essentially of water or a lower alkyl alcohol having one to eight carbon atoms. Depending on the starting phosphonium halide, however, more specific conditions may be preferred.

For example, the quaternary phosphonium bromide formed from 1-phenyl-3-methylphospholene and tetradecyl bromide, when treated with aqueous sodium hydroxide, yields two reaction products, namely, about 60 percent of the tetradecyl phospholene oxide and about 40 percent of the phenyl (methylbutenyl) tetradecyl phosphine oxide. The mixture can be separated by recrystallization from normal hexane, in which the open-chain compound is more soluble, or by efficient vacuum fractionation, the more volatile compound being the phospholene oxide.

As disclosed in my U.S. Pat. No. 3,331,878, the use of dimethylformamide or dimethylsulfoxide as the reaction solvent in the foregoing illustration results almost exclusively in the elimination of benzene from the phosphonium halide, with resulting production of the phospholene oxide.

The open chain compound is formed exclusively, from the cyclic phosphonium halide, as judged by a study of the infrared spectra by (i) treating the phosphonium halide with an alcohol solution of an alkali metal hydroxide or alkoxide or (ii) treating an aqueous solution of an alkaline material selected from the group consisting of ammonium hydroxide, water soluble amines, alkaline earth hydroxides and water-soluble salts of the alkali metals having a pH of at least about 9 in a 10 percent aqueous solution. Salts of the foregoing should be inert to the olefinic linkage of the alkenyl group.

Either (i) or (ii) will result almost exclusively in the opening of the phospholene ring. In general, these reactions may be carried out at a temperature between about 0° and the boiling point of the reaction media. When using alcoholic solutions of strong alkalis or alkoxides, the reaction will proceed rapidly at room temperature. However, when using aqueous weak alkalis, heating to a temperature between about 50° C and the boiling point is preferred to obtain substantial amounts of reaction in a reasonably short time.

The diallylphenylalkylphosphonium halides are decomposed, with the elimination of one of the allyl groups, by treatment with aqueous alkali metal hydroxides. Generally the reaction proceeds rapidly and smoothly at room temperature, although temperatures from about 0° to 100° are possible.

The above reactions are illustrated by the following typical equations:

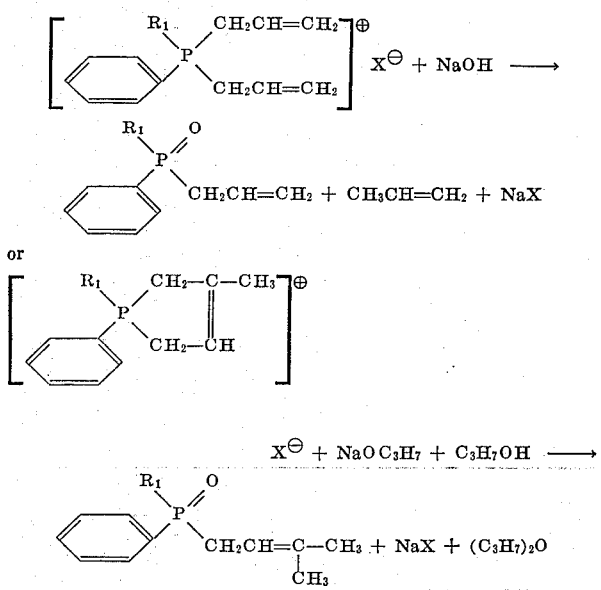

wherein $R_1$ is as defined above and X is a halide.

In the foregoing reactions, it should be pointed out that the location of the double bond in the alkenyl group may be altered during the course of the reaction. For example, in the decomposition of a diallyl phosphonium halide, the allyl group may rearrange to a propenyl group. Analogous rearrangements may occur where phospholene compounds are used.

The concentration of the alkali in the reaction medium is not important. The reaction has been successfully carried out with alkali concentrations of as little as 0.1 percent. However, there should be at least three equivalents of base present for each mole of phosphine oxide which is to be produced. When the reaction is carried out in an alcoholic solution, any of the alkali metal hydroxides or alkoxides may be used. Obviously, sodium or potassium are preferred because of their commercial availability, however, lithium, caesium and rubidium may also be used.

The alkoxides will normally have no more than eight carbon atoms, because the higher alkoxides tend to be insoluble. However, they may be used if they can be dissolved in the alcoholic medium by heating. Suitable alcoholic solutions of alkoxides such as sodium methoxide, sodium ethoxide, potassium propoxide, etc. may be prepared by dissolving the appropriate metal, i.e. metallic sodium or metallic potassium in the appropriate alcohol in an amount from 1 to 10 parts of alkali metal for each 100 parts of alcohol.

Alkaline materials useful to decompose the cyclic phosphonium halides in aqueous media with the production of the open-ring compound as substantially the sole product are characterized by a pH in a 10 percent aqueous solution of above about 9. Typical preferred alkaline materials which may be mentioned are:

|  | pH of 10% solution |
|---|---|
| Ammonium hydroxide | 11.6 |
| Calcium hydroxide | 12.2 |
| Monoethanolamine | 11.4 |
| Diethanolamine | 10.9 |
| Morpholine | 10.8 |
| Trisodium phosphate | 12.0 |
| Sodium tetraborate | 9.2 |
| Sodium carbonate | 11.15 |

Water soluble alkylamines may also be used in the preferred embodiment of this invention.

While the foregoing discussion has referred primarily to the use of alkaline materials based on sodium, potassium, ammonium and calcium, it should be recognized that this is only a reflection of the commercial importance of these materials. In general, the alkalies contemplated include the alkali metals, the alkaline earth metals, ammonium and substituted ammonium ions subject only to the above-discussed pH and solubility limitations.

Halides useful in the present invention are those yielding ionizable phosphonium compounds. Phosphonium chlorides, bromides and iodides are generally useful. Fluorides may also be used so long as the phosphonium fluoride is ionizable.

In carrying out the foregoing reaction, the phosphonium halide and base are combined in an aqueous or alcoholic solvent as is appropriate. The resulting long-chain aliphatic-phenyl-alkenyl-phosphine oxide is a water insoluble oil. When the solvent system is essentially aqueous, therefore, the phosphine oxide will spontaneously separate from the reaction mass. Where an alcohol is used as the solvent, it is usually desirable to add sufficient water to the reaction mass following completion of the reaction to cause the oil to separate therefrom.

For a crude product, it may be sufficient merely to separate the oil phase, containing the phosphine oxide, from the aqueous phase by decanting or similar methods. Where refined products are desired, it is frequently desirable, however, to extract the oil with a water-immiscible solvent, such as diethyl ether, and to purify the resulting product by drying and recrystallization.

The preparation of phosphine oxides according to the present invention is further illustrated by the following examples.

EXAMPLE 1

A mixture of 16.4 g. of 1-phenyl-3-methylphospholene (prepared as shown in U.S. Pat. No. 2,853,518) and 25.8 g. n-tetradecyl bromide was heated on an oil bath at 105°–115° for 2 hours, in an atmosphere of dry nitrogen. The product was dissolved in 100 ml. of warm distilled water and this was then added to 400 ml. of 10 percent sodium hydroxide solution. An oil separated out immediately. The temperature of the mixture was 40°. The flask was shaken vigorously for 15 minutes to bring into reaction any unchanged phosphonium bromide which may have been salted out by the alkali. The oil was extracted with 300 ml. ether, the ether solution washed with 50 ml. of distilled water and then dried overnight with anhydrous sodium sulfate. Evaporation of the ether left behind 30.7 g. of soft solid. This was dissolved in 100 ml. of normal hexane (Skellysolve B) and cooled for two hours in ice water. The product was filtered on a pre-cooled Buchner funnel and washed with 15 ml. of cold hexane. The yield of 1-tetradecyl-3-methylphospholene-1-oxide was 13.2 g., m.p. 56° C. The sample was purified by vacuum distillation, b.p. 208°/0.85 mm., m.p. 55°–61 C.

The hexane filtrate was freed of solvent by evaporation. The residue, 17.0 g., consisted of crude (methylbutenyl)-phenyltetradecylphosphine oxide. In order to obtain a pure sample for analysis, the material was separated into four fractions by vacuum distillation. The fourth fraction, 5.0 g., b.p. 220°/0.8 mm., m.p. 40° C., was the pure open-chain compound, as determined by an elemental analysis.

Analysis. Calculated for $C_{25}H_{43}OP$: C, 76.88; H, 11.10; P, 7.93

Found: C, 76.66; H, 11.25; P, 8.11

A sample was hydrogenated, giving (methylbutyl) phenyltetradecylphosphine oxide, m.p. 53°C.

Analysis. Calculated for $C_{25}H_{45}OP$: C, 76.48; H, 11.55; P, 7.89

Found: C, 76.65; H, 11.53; P, 7.70

A series of homologous compounds having from eight to 18 carbon atoms was prepared in a similar manner. In the case of the $C_8$, $C_{10}$, and $C_{12}$ compounds, vacuum fractionation was used, instead of recrystallization from Skellysolve B, for the separation of the open-chain compounds from the phospholenes.

The 1-tetradecyl-3-methyphospholene-1-oxide yielded an infrared (IR) spectrum with strong bands at 6.15 microns (olefinic unsaturation) and at 8.6 microns (phosphine oxide linkage). The methylbutenyl)phenyltetradecyl phosphine oxide gave an IR spectrum with a band at 8.6, but lacked the band at 6.15 microns, apparently because of the $-CH=C(CH_3)_2$ linkage. The two compounds are therefore easily distinguished from each other by their IR spectra.

A compound whose IR spectrum matched that of the (methylbutenyl)phenyltetradecylphosphine oxide was synthesized as follows: Isoprene monohydrochloride (also known as prenyl chloride, or gamma, gamma-dimethylallyl chloride, or 1-chloro-3-methyl-2-butene), 49 g., was treated with 36.5 g. magnesium in 300 ml. tetrahydrofuran. The amount of recovered, unused magnesium was 27.9 g. The Grignard was treated with 6.5 g. dichlorophenylphosphine, $C_6H_5PCl_2$. There was isolated 6.1 g. crude diprenylphenylphosphine, $C_6H_5P(CH_2CH=C(CH_3))_2$, b.p. 110°/1.0 mm. This was quaternerized with 6.90 g. tetradecyl bromide. The product was stirred with water, and the water-soluble portion treated with alkali, giving crude phenylprenyltetradecylphosphine oxide. The IR spectrum gave a band at 8.6 (P=O), but no band at 6.15 microns, just as in the case of the open-chain compounds derived by the opening of the phospholene ring.

The synthesized compound was hydrogenated with Raney nickel, and recrystallized, to give (methylbutyl) phenyltetradecylphosphine oxide, in an analytically pure form, m.p. 53° C. Analysis. Calculated for $C_{25}H_{45}OP$: C, 76.48; H, 11.55. Found: C, 76.41; H, 11.42. The infrared curve and melting point matched exactly those given by the hydrogenated compound derived from the cyclic phosphonium bromide described above.

On the other hand, when the above synthesis described for isoprene monohydrochloride was carried out with tiglyl chloride (1-chloro-2-methyl-z-butene), crude ditiglylphenylphosphine, $C_6H_5P(CH_2C(CH_3)=CHCH_3)_2$, was obtained b.p. 106°-116°0.08 mm., which, after quaternerizing with tetradecyl bromide and treatment with alkali, yielded a phosphine oxide (phenyl tetradecyltiglylphosphine oxide, $(C_{14}H_{29})(C_6H_5)P(O)CH_2C(CH_3)=CHCH_3$, whose infrared spectrum showed a band at 6.15 microns. Other compounds which also gave the 6.15 micron band are:

Allylphenyltetradecylphosphine oxide
beta-Methallylphenyltetradecylphosphine oxide
Propenylphenyltetradecylphosphine oxide
Crotylphenyltetradecylphosphine oxide.

EXAMPLE 2

Equal molar quantities of octadecyl bromide and 1-phenyl-3-methylphospholene of the formula

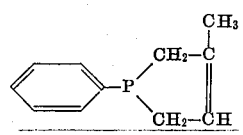

were heated at 105°-115° C. for two hours in an atmosphere of nitrogen. 5.30 grams of the crude phosphonium bromide thereby obtained were dissolved in 75 ml. of water.

To the aqueous solution of phosphonium bromide, a solution of 5 grams of sodium carbonate (anhydrous) in 25 ml. of water was added. At room temperature, the solution remained clear. It was gradually heated to the boiling point. At 60° C. the solution had become slightly turbid, and at 80° C., a distinct oil phase was observable. In order to allow adequate time for completion of the reaction, the mixture was maintained at the boiling point for about 5 minutes.

The resulting oil which separated from the aqueous reaction medium was extracted with ether, and the ethereal solution was washed with a sodium chloride solution. Finally, the ethereal solution was dried overnight in the presence of anhydrous sodium sulfate.

The ether was removed by distillation, and 4.5 grams of a residue was obtained. After recrystallization from normal hexane, the melting point was 50°- 55° C. The theoretical yield of (methylbutenyl)octadecylphenylphosphine oxide was 4.7 grams.

The composition of the reaction product was further characterized by an elemental analysis. The results are as follows:

Calculated for $C_{29}H_{51}OP$: C, 77.95%; H, 11.51%; P, 6.93%

Found: C, 77.99%; H, 11.44%; P, 7.05%

EXAMPLE 3

A further 1 gram sample of the crude phosphonium bromide prepared in Example 2 was dissolved in 20 ml. of normal propyl alcohol in which had previously been dissolved 0.4 grams of metallic sodium. The mixture was allowed to stand at room temperature for 20 minutes and then heated to 50° C. for 5 minutes. Water was added, and the oil which thereupon separated was extracted with ether. The ethereal solution was washed several times with water, then dried, and the ether distilled.

The residue weighed 0.81 grams. After recrystallization from normal hexane, the melting point was about 50°- 55° C.

It is recorded (Hey and Ingold, Jour. Chem. Soc., 1933, pps. 531–533) that dry tetramethyl phosphonium ethoxide will yield trimethyl phosphine oxide and propane (i.e. one of the methyl groups combines with the ethyl group). If such a reaction were to take place in the process described in Example 3, the butenyl group would be replaced by a heptenyl group according to the equation:

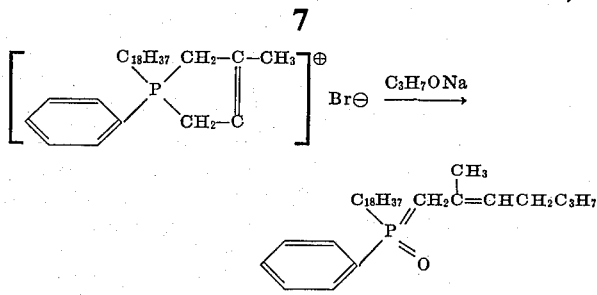

An elemental analysis demonstrates that such a compound was not formed:
Calculated

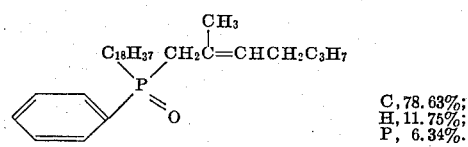

C, 78.63%;
H, 11.75%;
P, 6.34%.

Calculated

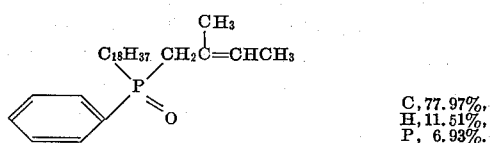

C, 77.97%;
H, 11.51%;
P, 6.93%.

Found for Product of Example 3: C, 77.39%; H, 11.41%; P, 6.90%.

Using the foregoing procedure, additional open-chain phosphine oxides were prepared from 1-phenyl-3-methylphospholene as follows:

n-Octyl(methylbutenyl)phenylphosphine oxide
(n-$C_8H_{17}$)($C_6H_5$)P(O)$CH_2$CH=C($CH_3$)$_2$
b.p. = 170/0.8 mm.

n-Decyl(methylbutenyl)phenylphosphine oxide
(n-$C_{10}H_2$)($C_6H_5$)P(O) $CH_2$CH=C($CH_3$)$_2$ n-Dodecyl(methylbutenyl)phenylphosphine oxide
(n-$C_{12}H_{25}$)($C_6H_5$)P(O)$CH_2$CH=C($CH_3$)$_2$ Elementary analysis.
$C_{23}H_{39}$OP: Calcd: C, 76.20; H, 10.84; P, 8.54
Found: C, 76.16; H, 10.84; P, 8.76 n-Hexadecyl(methylbutenyl)phenylphosphine oxide
(n-$C_{16}H_{33}$)($C_6H_5$)P(O)$CH_2$CH=C($CH_3$)$_2$
b.p. 240/1.2 mm.; m.p. = 44° C.

EXAMPLE 4

Diallylphenylphosphine was prepared following the procedure described by Jones et al. (Journal of the Chemical Society, 1947, page 1448) starting with the allyl Grignard reagent and dichlorophenylphosphine, $C_6H_5PCl_2$. The allyl Grignard had in turn been prepared by combining a suspension of 36.5 grams of magnesium and 200 ml. dry ether with 42 grams of allyl bromide dissolved in 200 ml. dry ether, the mixture being cooled during the addition of the allyl bromide and maintained under an atmosphere of nitrogen. The ether solution was decanted, and the unreacted magnesium was washed with 50 ml. of ether, the washings being added to the decantate.

22 grams (17 ml.) of dichlorophenylphosphine in 15 ml. of ether was added slowly to he Grignard mixture thereby obtained at approximately 0° C. After the addition of dichlorophenylphosphine, the mixture was refluxed for a half hour, and the Grignard mixture thereupon treated with an excess of ammonium chloride solution.

The ether solution was separated, dried with sodium sulfate and the ether removed therefrom by distillation under nitrogen. The residue was further fractionated, and 15.0 g. of diallylphenylphosphine, having a boiling point of 74°/0.5 mm. was obtained.

Caution in the foregoing preparation is required to avoid air oxidation of the diallylphenylphosphine. Accordingly, the distillation steps should be carried out under a nitrogen blanket.

The freshly distilled diallylphenylphosphine thereby obtained was immediately reacted with 21.9 grams of tetradecyl bromide under a nitrogen atmosphere, the mixture being heated to approximately 105°-115° C for 2 hours. The product, diallylphenyltetradecyhosphonium bromide, was a viscous mass which solidified after 2 days. The material was used without further purification for conversion into the phosphine oxide.

At room temperature 25.8 grams of the phosphonium bromide thereby obtained, dissolved in 250 ml. of distilled water, and a 10 percent aqueous solution of sodium hydroxide, were combined all at once. An oil separated out immediately and floated to the top. The mixture was stirred at 40° C. for 15 minutes so that the unreacted phosphonium bromide which may have been salted out could be brought into the reaction.

The oil was extracted with 300 ml. of ether, the ether solution dried and the ether removed therefrom by evaporation. The residue weighted 19.6 grams. The major portion, 18.9 grams was fractionated by vacuum distillation. The principle portion of the distillate, 12.5 grams was recovered at 205°- 220°/0.6 mm. The product was recrystallized from normal hexane and characterized by a melting point of about 56° C.

An elemental analysis was performed with the following results:
Calculated for $C_{23}H_{39}$OP: C, 76.20; H, 10.84
Found: C, 75.36; H, 10.83

An infrared spectrum was made of the reaction product. The undistilled material showed a band due to the presence of a terminal olefinic bond (920 cm$^{-1}$) as well as a larger band at 978 cm$^{-1}$, the latter being characteristic of trans R-CH=CHR'. For vacuum distilled phosphine oxide the band at 978 cm$^{-1}$ was larger, in proportion to the 920 cm$^{-1}$ band, than the crude undistilled portion Apparently, during the distillation some of the allyl compound isomerized into the propenyl phosphine oxide. The recrystallized higher melting point material showed the largest proportion of propenyl compound.

In other runs, the higher melting point material always contained more of the propenyl compound, but in no instance, was there more than 50 percent of the allyl compound in the lower melting material isolated from the filtrate after removal, by crystallization, of the higher melting propenyl compound.

EXAMPLE 5

Phenylpropenyltetradecylphosphine oxide was prepared following generally the same procedure as outlined in Example 4.

Dipropenylphenylphosphine was prepared as a starting material following the procedure described in Example 4 for the preparation of diallylphenylphosphine, substituting however, propenyl bromide for allyl bromide previously used. In preparing the dipropenylphenylphosphine employing the Grignard reaction, it was found necessary to initiate the reaction by adding a small amount of methyl iodide. Tetrahydrofuran was used as the solvent.

The dipropenylphenylphosphine thereby obtained was quaternized by reacting it with tetradecyl bromide. It was found necessary to maintain the mixture of dipropenylphenylphosphine and tetradecyl bromide at a temperature of 105°–115° C. for a period of 8 hours in order to achieve the desired reaction. The product was a syrup at first, but after standing several days at room temperature, it solidified.

To a solution of 10.0 grams of the resulting crude phosphonium bromide was added a 10 percent aqueous solution of sodium hydroxide at room temperature. During the first few second following the addition of the sodium hydroxide, the solution remained clear. Then, all at once, the solution became turbid. The mixture was allowed to stand for 1 hour at room temperature, during which time the oil formed separated on top. The oil was extracted with 200 ml. of ether and the ether solution washed with 50 ml. of water and dried overnight with anhydrous sodium sulfate. Ether was removed by evaporation on a water bath.

The residue was heated to 75°–80° C. under vacuum until gas bubbles were no longer formed (about 2 hours). The residue weighed 7.9 grams. For purposes of analysis, 2.74 grams of the product was recrystallized from 10 ml. of n-hexane and washed with 6 ml. of ice cold solvent. The recrystallization matter was characterized by a melting point of 56° C. On elemental analysis of the product the following results were obtained:

Calculated for: $C_{23}H_{39}OP$: C, 76.20; H, 10.84
Found: C, 75,68; H, 11.10

An infrared spectrum was determined. The spectrum indicated no terminal unsaturation (i.e. no band 920 cm$^{-1}$) and gave a strong band at 978 cm$^{-1}$, characteristic of trans RCH=CHR'.

As already mentioned, the alkenyl compounds prepared as illustrated in the foregoing examples, are useful intermediates in the preparation of detergent-active substances. Specifically, the intermediates of the present invention may be converted into useful detergents of the formula:

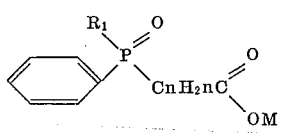

wherein $R_1$ is an acyclic aliphatic hydrocarbon radical having eight to 18 carbon atoms, "n" is an integer from 0 to 3, and M is a water solubilizing cation such as hydrogen, an alkali metal, ammonium, or a substituted ammonium ion e.g. ethanolammonium, and triethanolammonium. The compounds of the above formula may be readily obtained by subjecting the intermediate alkenyl-substituted phosphine oxides to oxidation under conditions sufficient to break the olefinic linkage and to convert the hydrocarbon fragment remaining attached to the phosphorous atom into a carboxylic group. The reaction is illustrated by the following equation:

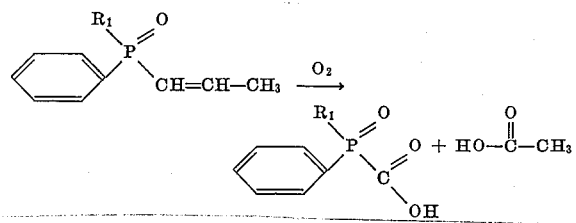

Such a procedure is illustrated in Example 6.

EXAMPLE 6

An oxidizing solution was made by dissolving 6 grams of potassium permanganate and 1.2 grams of sodium hydroxide in 100 ml. of distilled water. The unsaturated phosphine oxide (0.3–3.0 g) in a small flask was treated by adding the permanganate solution thereto until it was no longer decolorized. The excess permanganate remaining in the oxidized material was destroyed by the addition of 1 to 5 ml of methanol.

The resulting solution was filtered, and the manganese dioxide on the filter was washed with hot water or 1 percent sodium hydroxide solution until the filtrate was free of the sodium soap. The filtrate and washings were acidified, and the precipitated organic long-chain acid was extracted with ether. The ethereal solution was washed with water, dried, and the ether distilled, thereby to recover the phosphine oxide-carboxylic acid.

The soap was formed by dissolving the acid in alcohol and neutralizing it with 0.5 N sodium hydroxide. The solid sodium soap was obtained by evaporating the solution to dryness.

Two sodium soaps prepared as outlined above were evaluated as detergents without builders. Terg-O-Tometer detergent tests showed that the soaps were moderately effective. The results are summarized in the following table.

| Unoxidized intermediate Compound | *Detergency Units |
|---|---|
| Dodecylphenylpropenyl phosphine oxide | 8.0 |
| Dodecyl(methylbutenyl) phenyl phosphine oxide | 7.9 |
| Distilled water | 1.0 |

*Measured using the sodium soap of the acid produced by oxidizing the named intermediate with KMnO$_4$. Detergency tests were run using a 0.05% solution of the soap in distilled water at 120°F. Measurements were made on cloth swatches which had been soiled with vacuum cleaner dirt.

EXAMPLE 7

By following the procedures as described in Example 6, additional soaps having the generic formula

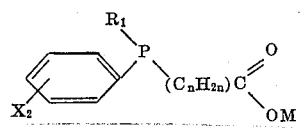

may be derived. These include:
(a) Sodium n-octyl (carboxymethyl) (methylphenyl) phosphine oxide wherein $R_1 = C_8H_{17}$, n = 1, $X_2 = CH_3$, M = Na;
(b) Potassium n-octadecyl (carboxyethyl)

(isopropylphenyl) phosphine oxide wherein $R_1 = C_{18}C_{37}$, n = 2, $X_2 = C_3H_7$, M = K;

(c) Ammonium n-mixed coco (carboxy) (tetradecylphenyl) phosphine oxide wherein $R_1 = C_8$–$C_{14}$ (mixed coco), n = 0, $X_2 = C_{14}H_{29}$, M = $NH_4$;

(d) Monoethanolammonium n-mixed tallow (carboxymethy) (octylphenyl) phosphine oxide wherein $R_1 = C_{16}$–$C_{18}$, (mixed tallow), n = 1, $X_2 = C_8H_{17}$, M = $HOCH_2CH_{23}$;

(e) Triethanolammonium 11-methyldodecyl (carboxymethyl) phenyl phosphine oxide wherein $R_1 = $ iso-$C_{13}$, n = 1, $X_2 = $ absent, M = $(HOCH_2CH_2)_3NH$;

(f) Sodium dodecyl (carboxymethyl) (dodecylphenyl) phosphine oxide wherein $R_1 = C_{12}H_{25}$, n = 1, $X_2 = C_{12}H_{25}$ (the dodecyl radical being derived from propylene polymer), M = Na.

In like manner each of the unsaturated compounds described in Examples 1 to 5 may also be converted to a corresponding soap.

EXAMPLE 8

A solution of 3.68 g. of n-dodecyl(methylbutenyl) phosphine oxide in 12 ml. of formic acid (98 percent) was treated with 1.15 g. of 30 percent hydrogen peroxide. At first, two layers were formed. The mixture, however, soon warmed up spontaneously, and became homogeneous. The mixture was allowed to stand at room temperature over the week-end. A test showed that all the hydrogen peroxide had been consumed. The formic acid was removed by evaporation on the water bath, with the aid of a water pump. The residue was treated with a solution of 2.28 g. potassium hydroxide in 30 ml. of anhydrous alcohol, and the mixture refluxed for 1 hour. The alcohol was removed by evaporation in vacuum on the water bath. To the residue was added 100 ml. of water, and the insoluble material was extracted with 120 ml. of ether. The ether extract was washed with water in a separatory funnel. It was noticed at this point that the glycol was an excellent emulsifier, since it took a long time for the ether and water layers to separate. After drying with anhydrous sodium sulfate, the ether was evaporated leaving 3.27 g. of the phosphine oxide glycol.

The potassium hydroxide solution together with the ether wash water was acidified with dilute hydrochloric acid, and the precipitate extracted with 100 ml. ether. This was washed with water, dried with sodium sulfate, and the ether removed by evaporation. A residue of 0.30 g. was obtained. This alkali-soluble substance had been formed as a result of the breaking of the double bond, to yield a carboxylic acid, n-$C_{12}H_{25}(C_6H_5)P(O)CH_2COOH$ plus acetone. A far better yield of this latter compound is obtained by oxidation with alkaline potassium permanganate, as illustrated in the example above.

Like treatment of the other compounds referred to in Examples 1 to 5 with hydrogen peroxide as described in the first portion of this example will yield corresponding phosphine oxide glycols which may in turn be oxidized to phosphine oxide carboxylates.

I claim:

1. A compound of the formula

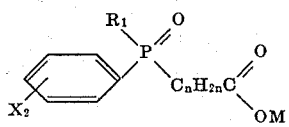

wherein $R_1$ is an acyclic aliphatic hydrocarbon radical having from eight to 18 carbon atoms, n is an integer from 0 to 2, $X_2$ is a member of the group consisting of H and alkyl having one to 14 carbon atoms, and M is selected from the group consisting of hydrogen, alkali metal, ammonium, ethanolammonium, and triethanolammonium.

2. A compound according to claim 1 having the formula

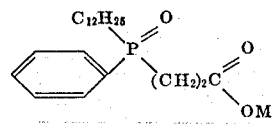

3. A compound according to claim 1 having the formula

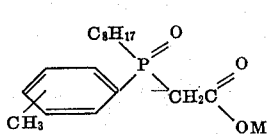

4. A compound according to claim 1 having the formula

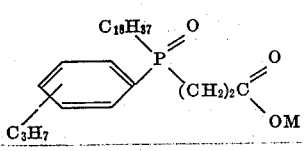

5. A compound according to claim 1 having the formula

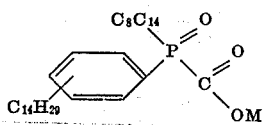

6. A compound according to claim 1 having the formula

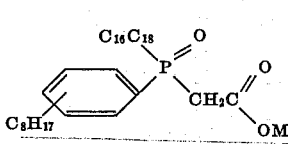

7. A compound according to claim 1 having the formula

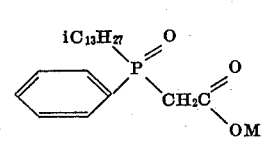

8. A compound according to claim 1 having the formula

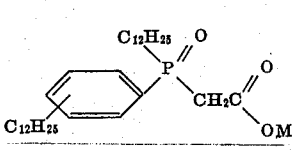

9. A compound according to claim 1 having the formula

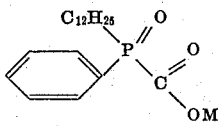

10. A compound according to claim 1 having the formula
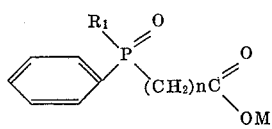
wherein $R_1$, $n$ and M are as defined in claim 1.
11. A compound according to claim 1 having the formula
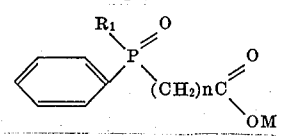
wherein $R_1$ and $n$ are as defined in claim 1, and M is selected from the group consisting of alkali metal and ammonium ions.
* * * * *